United States Patent [19]

Davis

[11] Patent Number: 4,746,142
[45] Date of Patent: May 24, 1988

[54] FOLDABLE AUTOMOBILE TRAILER

[76] Inventor: James E. Davis, 15609 Renner Rd., Olathe, Kans. 66062

[21] Appl. No.: 89,676

[22] Filed: Aug. 26, 1987

Related U.S. Application Data

[63] Continuation of Ser. No. 818,343, Jan. 10, 1986, abandoned.

[51] Int. Cl.$^4$ .............................................. B62D 63/00
[52] U.S. Cl. ........................................ 280/656; 280/37
[58] Field of Search ............... 280/656, 639, 482, 699, 280/718, 720, 37

[56] References Cited

U.S. PATENT DOCUMENTS

| | | | |
|---|---|---|---|
| 2,080,709 | 5/1937 | Hall et al. | 280/656 |
| 2,456,013 | 12/1948 | Nelson | 280/656 |
| 2,665,142 | 1/1954 | Talbert | 280/656 X |
| 3,469,506 | 12/1969 | Kerr et al. | 280/656 |
| 3,829,115 | 8/1974 | Rich | 280/656 |
| 4,126,324 | 11/1978 | Browning | 280/656 X |
| 4,230,340 | 10/1980 | Wasservogel | 280/656 |
| 4,239,258 | 12/1980 | Burris | 280/639 |
| 4,362,316 | 12/1982 | Wright | 280/656 |
| 4,480,851 | 11/1984 | St. Pierre | 280/656 |
| 4,522,425 | 6/1985 | Cornwall et al. | 280/656 |

Primary Examiner—John J. Love
Assistant Examiner—Michael Mar
Attorney, Agent, or Firm—Hovey, Williams, Timmons & Collins

[57] ABSTRACT

A two-wheeled trailer for automobiles has a forward bed section and a rearward bed section hingedly connected to the forward bed section. A pair of wheel assemblies, located adjacent opposite sides of the rearward bed section, are each coupled to leaf springs which in turn are detachably connected to the rearward bed section, and an elongated axle is removably fixed to each of the wheel assemblies. A forward portion of each of the leaf springs is pivotally coupled to the bed section, while a rear portion of the leaf springs is slidably received within structure connected to the bed and defining a channel in order to allow longitudinal extension of the leaf springs during loadings. A tongue assembly for coupling the trailer to a vehicle includes an elongated, tubular member pinned at a rear portion to the bed, and a front portion of the member slidably receives a tongue. A single pin connects both the tongue and the tubular member front portion to the bed.

3 Claims, 2 Drawing Sheets

FOLDABLE AUTOMOBILE TRAILER

This is a continuation of application Ser. No. 818,343, filed on Jan. 10, 1986, now abandoned.

BACKGROUND OF THE INVENTION

1. Field of the Invention

This invention relates to an automobile trailer having hingedly interconnected forward and rearward bed sections, a pair of wheel assemblies removably coupled to an elongated, straight axle and leaf springs interconnecting each wheel assembly to the rearward bed section. In preferred forms of the invention, the front end of each of the leaf springs is pivotally coupled to the rearward bed section by a removable pin, and the rear end of each leaf spring slidably engages structure connected to the rearward bed section defining a channel so that removal of the springs and wheel assemblies from the trailer bed is facilitated.

2. Description of the Prior Art

Various types of two wheeled automobile trailers have been constructed in the past to increase the overall loading capability of the vehicle both in terms of weight as well as volume. Commonly, commercially available trailers comprise a structure having fixed, overall dimensions, and while these trailers are satisfactory for the sole function of transporting loads, such trailers are obviously inconvenient for the average person due to the problem of storage of the trailer when the latter is not in use. As a result, such trailers are typically rented as needed, thereby resulting in considerable expense and inconvenience for the user.

A variety of trailers have been proposed in the past which are comprised of component parts which can be fitted together for use, and subsequently retracted or disassembled after use in order to minimize space for storage of the trailer components. As an example, U.S. Pat. No. 2,080,709 to Hall et al., dated May 18, 1937, illustrates a trailer having a foldable body portion and equipped with a pair of independent, swivel wheels which may be selectively detached from the body portion by means of a mortise and tenon type joint.

Another type of two wheeled trailer is shown in U.S. Pat. No. 4,522,425 to Cornwall et al., dated June 11, 1985. This trailer has wheels mounted on trunions which can be pivoted to locate the wheels beneath the trailer bed.

Other types of foldable or collapsible trailers are shown in U.S. Pat. Nos. 4,362,316, 4,239,258, 4,230,340, 2,456,013 and 2,469,506.

Unfortunately, it has been found that the known trailer assemblies that are foldable or collapsible for storage do not provide satisfactory performance in use. In particular, the known prior art collapsable trailer assemblies are subject to side-by-side weaving when towed behind a vehicle and also exhibit other unsteady operating characteristics such as excessive vibration and the like. Moreover, many of these trailers require tools and excessive amounts of labor for assembly and disassembly.

SUMMARY OF THE INVENTION

The present invention advances the art of trailer construction to a degree heretofore unknown by provision of a foldable trailer which offsets superior road handling characteristics regardless of whether the trailer is fully loaded or substantially empty. Moreover, the trailer assembly of the present invention can be readily assembled or disassembled in minutes without the use of tools, and is foldable to a small, lightweight package which can be readily fitted within the trunk of a typical passenger vehicle.

In more detail, the trailer includes hingedly interconnected forward and rearward bed sections which can be selectively fixed to a flat, horizontal orientation by means of a brace and pin. A straight, elongated axle positioned in underlying relation to the rearward bed section is removably coupled to a pair of wheel assemblies located outwardly on opposite sides of the bed. A pin and retaining clip are used to removably coupled the axle to each wheel assembly.

A leaf spring detachably interconnects each of the wheel assemblies to the rearward bed section. Preferably, the forward end of the leaf spring is formed to present a bore, thus enabling the use of a pin and retaining clip for pivotally coupling the forward end of the leaf spring to the rearward bed section. Additionally, the rear section of the leaf spring is slidably received within structure connected to the rearward bed section and defining a channel for accommodating extension of the spring during loadings. Thus, the installation and removal of each leaf spring from the trailer bed is facilitated and can be accomplished by merely detaching a single pin and lifting the spring from the channel.

In other forms of the invention, the trailer is provided with a removable tongue assembly that comprises an elongated, tubular member having a rear portion detachably coupled to the trailer bed and a front portion which telescopically receives a complimental tongue. A single pin is provided for releasably fixing the front portion of the tubular member as well as the rear portion of the tongue to a support secured to the bed. The telescopic tongue assembly increases the overall strength of the trailer in use, and can be readily removed from the latter and disassembled for storage.

The hinged interconnection between the rearward and forward bed sections enables the bed to be folded to present a compartment for storing the wheel assemblies, axle and tongue assembly. During disassembly, pins connecting the axle to the wheel assemblies can be removed, and the wheel assemblies along with their associated leaf springs can be together stored within the compartment. Furthermore, the axle and tongue assembly (including the tubular member and elongated tongue) are sized for reception within the compartment adjacent the wheel assemblies.

Desirably, the forward and rearward bed sections are comprised of aluminum while the wheel assemblies, springs, axle and hinges are well as the tongue assembly are comprised of steel. Consequently, the trailer is lightweight so that the average individual can lift the folded package and place it within a trunk of a car when necessary.

DETAILED DESCRIPTION OF THE DRAWINGS

Figure 1:
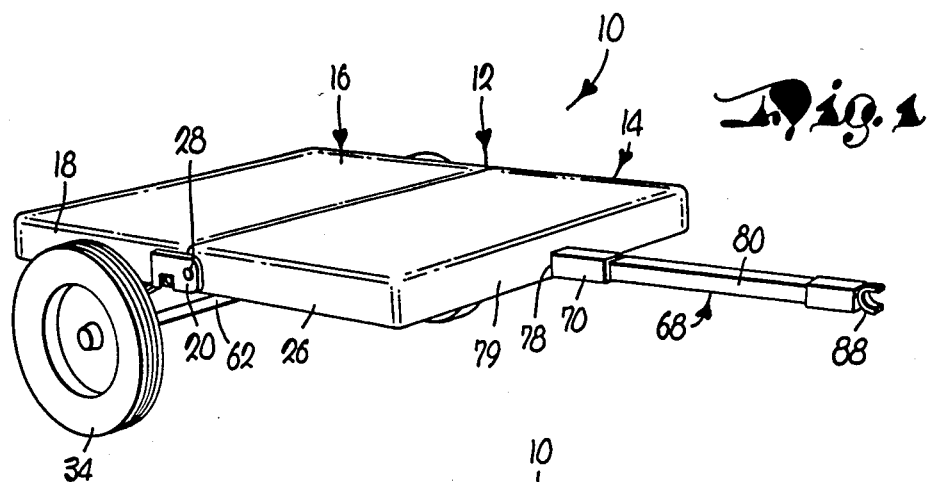
FIG. 1 is a perspective view of the trailer assembly of the present invention shown in its assembled configuration for use.
Figure 2:
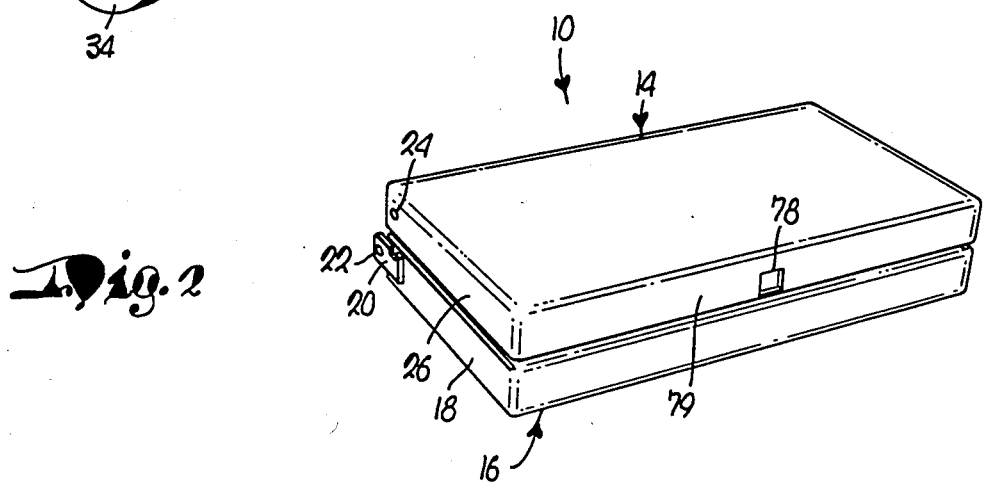
FIG. 2 is a perspective view of the trailer assembly of FIG. 1 wherein the wheel assemblies, tongue and axle have been placed within a rearward bed section and a forward bed section folded to meet the rearward bed section and enclose the components in a compartment for storage.
Figure 3:
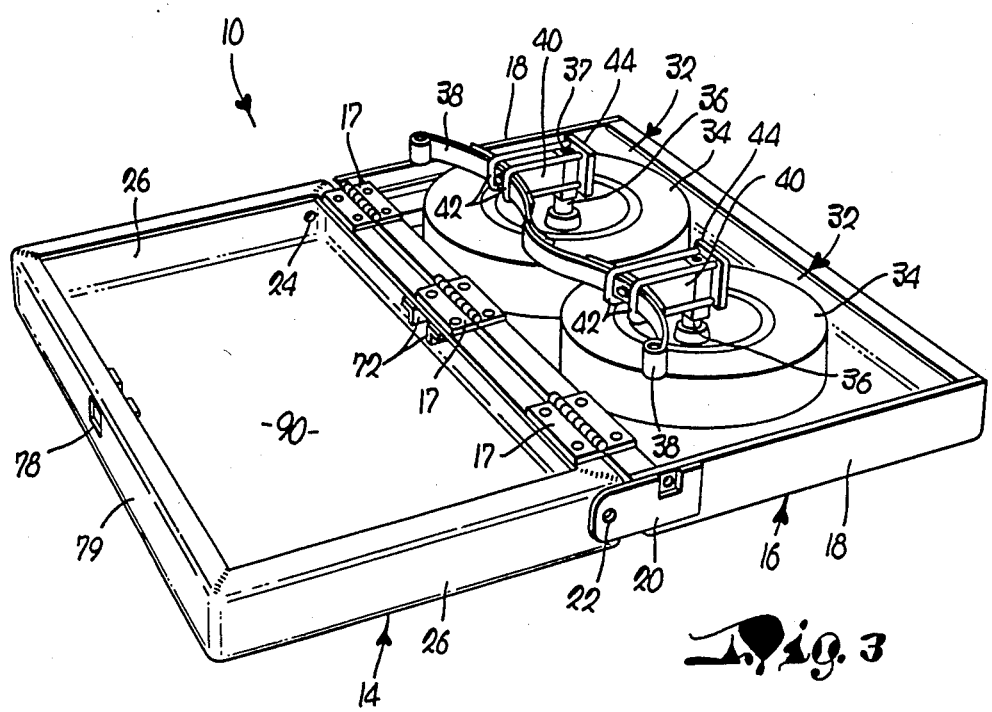
FIG. 3 is a view of the assembly of FIG. 2, wherein the forward bed section has been opened to reveal the wheel assemblies and associated leaf springs.

A foldable trailer of the present invention designated broadly by the numeral 10 and is shown in FIGS. 1–6. The trailer 10 has a bed 12 comprising a forward bed section 14 as well as a rearward bed section 16. Three hinges 17, as best seen in FIG. 3, pivotally interconnect the forward bed section 14 to the rearward bed section 16.

The rearward bed section 16 is provided with two opposed sides 18, 18, each of which are fixedly connected to a forwardly projecting brace 20, 20, as shown in FIG. 1–3. The braces 20, 20 each have a hole 22 which is in alignment with a hole 24 provided in each of a pair of sides 26, 26 of the forward bed section 14 whenever the latter is in flat, coplanar orientation with the rearward bed section 16, as depicted in FIGS. 1 and 3. A pin 28 (see FIGS. 1 and 4) is received within each of the holes 22, 24 and is utilized in combination with a clip 30 for selectively locking each brace 20 to the respective side 26 and thereby retaining the forward bed section 14 in coplanar horizontal alignment with the rearward bed section 16 during periods of use.

Figure 4:
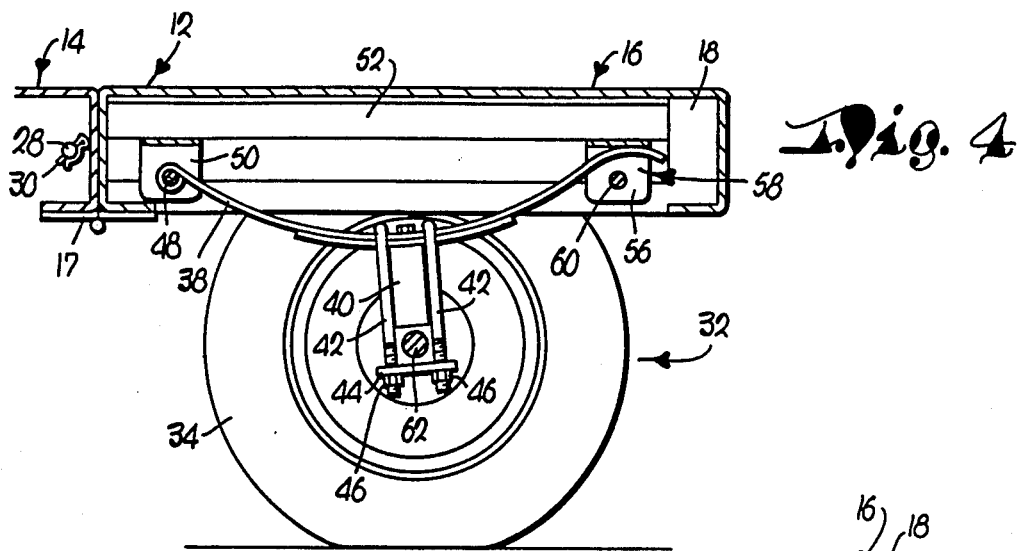
FIG. 4 is an enlarged, fragmentary, side-sectional view of the trailer of FIG. 1, particularly illustrating the connection between the leaf springs and the rearward bed section.
Figure 5:
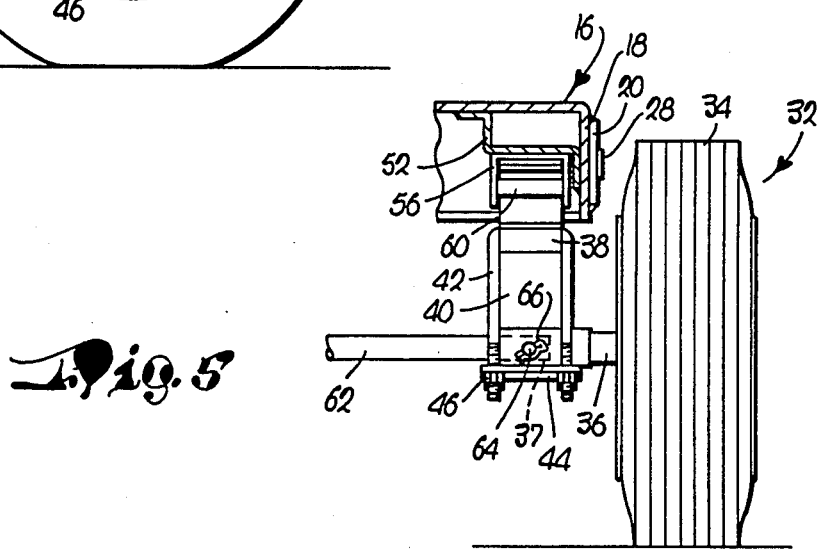
FIG. 5 is a fragmentary, enlarged, end sectional view of the wheel assembly and leaf spring shown in FIG. 4.

A pair of wheels assemblies 32, 33 are located outwardly on opposite sides 18, 18 of the rearward bed section 16. Each wheel assembly 32 has a tire 34 that is rotatably mounted on a turned down, cylindrical section of a spindle 36. As shown in FIGS. 4 and 5, the spindle 36 also includes a square-in-cross-section portion having a bore 37 for purposes to be explained hereinafter.

A spring means or double leaf spring 38 detachably interconnects each of the wheel assemblies 32 to the rearward bed section 16. A spring shackle block 40 is positioned intermediate a central portion of each leaf spring 38 and one side of the squared portion of the spindle 36. A pair U-bolts 42, 42, in cooperation with a plate 44 and nuts 46, clampingly secure the leaf spring 38 to the shackle block 40 and thus to the associated wheel assembly 32.

Figure 6:
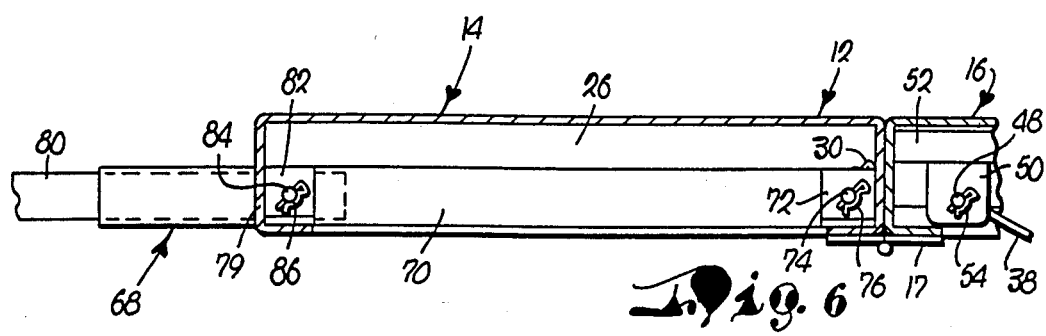
FIG. 6 is an enlarged, fragmentary sidesectional view of the tongue assembly and the bed sections of the trailer depicted in FIG. 1.

A first or forward end portion of each of the leaf springs 38 is pivotally coupled to the bed 12 by means of a pin 48 which is selectively received within a cylindrical bore that is defined by the curved, forward end portion of the leaf spring 38. The pin 48 as shown in FIGS. 4 and 6 is slidably insertable within opposed holes of a spring hanger 50 which is, in turn, secured to a Z-shaped spring mounting base 52 fixed to the rearward bed section 16 (see also FIG. 5). A retaining clip 54 (see FIG. 6) received within an orifice of the pin 48 selectively fixes the pin 48 to the hanger 50. As shown in Fig.s 1 and 2, the brace 20 has a notch for enabling the insertion of the pin 48 through a hole in the rearward bed side 18 and into the formed forward end of the spring 38 as well as the holes in the hanger 50.

Referring to FIGS. 4 and 5, a U-shaped structure 56, mounted to the spring base 52, defines a channel 58 for slidably receiving a second or rearward end portion of the leaf spring 38. As shown in FIG. 4, an upwardmost, convex portion of the spring 38 slidably engages a horizontal portion of the structure 56. A bolt 60 extends through both sides of the U-shaped structure 56 to retain the spring 38 within the channel 58 whenever the pin 48 is received within the formed bore of the forward portion of the leaf spring 38.

An elongated, straight, cylindrical axle 62 is positioned in underlying, spaced relationship to the rearward bed section 16 and has opposite end portions. Each of the wheel assemblies 32, 32 are removably secured to the opposite end portions of the axle 62 by means of a pin 64 and retaining clip 66, as shown in FIG. 5.

A removable tongue assembly 68 comprises an elongated, tubular, square-in-cross-section member 72 having a rear portion and a front portion, as depicted in FIG. 6. A bracket means or pair of L-shaped brackets 72, 72 detachably couple the rear portion of the tubular member 70 to the rear side of the forward bed section 14 by means of a pin 74 that is inserted within holes of the front portion of the tubular member 70 as well as holes in the brackets 72, and the clip 74 is selectively secured in place by means of a retaining clip 76. As illustrated, the forward portion of the tubular member 70 extends through a complimental, square aperture or hole 78 (FIGS. 2–3) disposed in a front side 79 of the forward bed section 14.

The tongue assembly 68 also includes a tongue means or elongated square-in-cross-section tongue 80 which has a rear portion configured for complimental, mating, telescopic fit within the front portion of the tubular member 70. The tongue 80 extends approximately to the location of the dashed lines as shown in FIG. 6. A support means or two L-shaped supports 82, 82 fixedly engage the forward bed section 14 at a location spaced from the brackets 72, 72 on opposite sides of the hole 78. A pin 84 is insertably received within mating holes of the supports 82, 82, the tongue 80 as well as the member 70, and is selectively fixed in place by means of a retaining clip 86 received within a hole in the pin 84. The forwardmost portion of the tongue 80 is shown as having a C-shaped hitch 88, although other types of coupling means could be substituted for connecting the trailer 10 to a vehicle.

FIG. 2 illustrates the configuration of the trailer assembly 10 when the latter is disassembled for storage. As shown, the forward section 14 is pivoted by means of the hinges 17 toward an adjacent, side-by-side position relative to the rearward bed section 16. In such an orientation, the sections 14, 16 combine to form a package which preferably is small enough to be stowed within the trunk of a typical passenger vehicle.

During assembly of the trailer 10 for use, the forward bed section 14 is unfolded away from the rearward section 16 until the sections 14, 16 are positioned in the flat, coplanar orientation illustrated in FIG. 3. Next, the pins 28, 28 are inserted within the holes 22 of each brace 20, as well as the holes 24, 24 of each rearward bed section side 18, and the clip 30 is secured to each pin 28 to retain the latter in a fixed position.

Subsequently, the wheel assemblies 32, 32 are removed from an interior compartment 88 formed by the sections 14, 16 and each end of the axle 62 is slidably inserted within the bore 37 of the respective wheel assembly 32. Next, the pin 64 is inserted within an orifice of the axle 62 as well as mating holes in the spindle 36, and the clip 66 is secured to the pin 64 to preclude accidental removal of the latter.

Subsequently, the axle 62, along with the wheel assemblies 32, 32 are shifted so that the rear portion of each of the leaf springs 38, 38 is received within the channel 58 of respective structures 56, 56. Next, the pins 48, 48 are inserted within the formed bore of the front portion of the leaf springs 38, 38 and the clips 54, 54 are introduced into the holes of respective pins 48, 48 to retain the latter in position.

The tongue assembly 68 is then installed by inserting the tubular member 70 within the hole 78 until the rearward end of the member 70 approaches the brackets 72, 72. Subsequently, the pin 74 is inserted within the holes of the brackets 72, 72 as well as the tubular member 70 and the retaining clip 76 is introduced through a hole in the pin 74 to prevent the latter from loosening and also to lock the member 70 to the brackets 72. Next, the tongue 80 is slidably inserted within the front portion of the tubular member 70, and the pin 84 is put in the mating holes of the supports 82, 82, the tongue 80 as well as the member 70, and the clip 86 is then inserted within a hole of the pin 84 to secure the latter in place.

The trailer 10 may then be readied for use by picking up the tongue 80 and turning the trailer 10 over to the position as shown in FIG. 1. Disassembly of the trailer 10 for storage can be accomplished by reversal of the above mentioned assembly procedure.

In use, it has been found that the trailer 10 exhibits superior road handling characteristics in comparison to known prior art constructions. The trailer 10 does not wobble or weave from side-toside and instead can be pulled in a steady fashion, as is similar to a chariot. It is believed that the superior handling characteristics of the trailer 10 are due in part to the provision of the fixed axle 62 which is secured on opposite ends to the wheel assemblies 32, 32.

Easy assembly and disassembly of the trailer 10 is facilitated by the means of connection of the leaf springs 38 to the rearward bed section 16. In particular, it is observed that after insertion of the rearward portion of the springs 38 into the channel 58, the springs 38 need only be positioned at their forward end to receive the pin 48. Such construction is in contrast to prior art leaf spring wheel and frame assemblies wherein one end of the spring is pinned to the frame, while the other end of the spring is pivotally connected to a linkage which is in turn pivotally coupled to the frame, so that two pins must be properly aligned with the spring for assembly.

It is noteworthy that the axle 62, the tubular member 70 and the tongue 80 are of a length to fit within the compartment 88 when the forward bed section 14 is shifted to a closed position adjacent the rearward bed section 16. In this regard, and viewing FIG. 3, the axle 62, the member 70 and the tongue 80 may be placed in the rearward bed section 16 intermediate the wheel assemblies 32, 32 and the rearward end of the rearward bed section 16, although such a tongue 80 is now shown in the drawings. Furthermore, the tongue assembly 68 may be readily installed by merely utilizing two pins 74, 84 and respective clips 76, 86.

I claim:

1. A trailer which may be selectively disassembled and folded to a relatively small profile package comprising:

a forward bed section having a top and four normally upright sides fixedly connected to said top;

a rearward bed section having a top and four normally upright sides fixedly coupled to said top of said rearward bed section;

a pair of wheels;

axle means releasably coupled to said pair of wheels;

spring means detachably connecting said axis means to one of said bed sections;

hinge means interconnecting said forward bed section and said rearward bed section for enabling selective movement of said forward bed section relative to said rearward bed section between an unfolded, use position and a folded orientation to present a compartment which is substantially enclosed by said top and said four sides of both said forward bed section and said rearward bed section, said compartment being of a size sufficient for carrying said pair of wheels, said axle means, and said spring means and a removable tongue assembly for towing said trailer including an elongated tongue having a rear portion and an elongated member having a front portion and a rear portion, said tongue rear portion and said member front portion being complementally configured for enabling sliding, telescopic reception of one of said tongue rear portion and said member front portion into the other of said tongue rear portion and said member front portion to an assembled orientation and for establishment of a connection therebetween, said sides of said forward bed section including a front side having structure defining an aperture and a rear side disposed adjacent said hinge means in spaced, parallel relation to said front side, said forward bed section including a bracket connected to said rear side and a support connected to said front side adjacent said aperture and aligned with said bracket, said tongue assembly when in said assembled orientation being received through said aperture with said connection being disposed adjacent said support, with said member extending across said forward bed section with said rear portion of said member being located adjacent said bracket, said tongue assembly including means for releasably securing said member front portion to said support and means for releasably securing said member rear portion to said bracket, said tongue assembly being removable from said aperture in order to increase the available volume of said compartment when said forward bed section and said rearward bed section are in said folded orientation, said tongue and said member both being of a length to be completely received in said compartment when said forward bed section and said rearward bed section are in said folded orientation and wherein said member when secured to said bracket extends through said aperture, and wherein said tongue rear portion also extends through said aperture when said tongue assembly is in said assembled orientation.

2. The invention as set forth in claim 1, wherein said member is hollow for reception of said tongue rear portion therein.

3. The invention as set forth in claim 1, wherein said means releasably securing said member front portion to said support comprises a pin extending through said support, said member front portion and said tongue rear portion.

* * * * *